(12) United States Patent
Huang (10) Patent No.: US 7,914,274 B2
(45) Date of Patent: Mar. 29, 2011

(54) MOLDING APPARATUS

(75) Inventor: Chien-Feng Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 264 days.

(21) Appl. No.: 12/251,724

(22) Filed: Oct. 15, 2008

(65) Prior Publication Data
US 2009/0238913 A1 Sep. 24, 2009

(30) Foreign Application Priority Data
Mar. 20, 2008 (CN) .......................... 2008 1 0300638

(51) Int. Cl.
B29D 11/00 (2006.01)
B29C 45/10 (2006.01)

(52) U.S. Cl. .................... 425/192 R; 425/195; 425/400; 425/412; 425/468; 425/808; 249/63; 249/139

(58) Field of Classification Search .................. 425/190, 425/191, 192 R, 193, 195, 395, 400, 403, 425/408, 412, 414, 416, 466–468, 470, 577, 425/808, DIG. 10, DIG. 58; 249/63, 175, 249/177, 139

See application file for complete search history.

(56) References Cited

U.S. PATENT DOCUMENTS

| 6,739,569 | B2 * | 5/2004 | Bickert ........................ 249/120 |
| 6,997,693 | B2 * | 2/2006 | Horner et al. .............. 425/174.4 |
| 7,134,864 | B2 * | 11/2006 | Yang et al. .................... 425/195 |
| 7,699,298 | B2 * | 4/2010 | Shen et al. ...................... 269/47 |
| 2007/0243277 | A1 * | 10/2007 | Tsai .............................. 425/193 |
| 2009/0117221 | A1 * | 5/2009 | Tsai et al. .................... 425/556 |
| 2009/0191299 | A1 * | 7/2009 | Huang ........................ 425/451.9 |
| 2009/0194667 | A1 * | 8/2009 | Huang .......................... 249/184 |

FOREIGN PATENT DOCUMENTS

DE 42 17 343 A1 * 12/1993
JP 61-120711 A * 6/1986
WO WO 88/00559 A1 * 1/1988

* cited by examiner

Primary Examiner — Joseph S Del Sole
Assistant Examiner — Dimple Bodawala
(74) Attorney, Agent, or Firm — Andrew C. Cheng (57) ABSTRACT

A molding apparatus includes a first mold half, a first mold core received in the first mold half, a second mold half opposite to the first mold half, a second mold core and a plurality of spacers. The second mold core includes a sleeve and a core insert. The sleeve is received in the second mold core. The sleeve includes a receiving hole defined therein, and a plurality of parallel grooves defined in an inner surface in the receiving hole. The grooves are angularly equidistantly spaced from each other. The core insert is received in the receiving hole of the sleeve. The plurality of spacers is configured for being selectively disposed in the corresponding grooves. Each of the spacers is configured for being sandwiched between the sleeve and the core insert.

6 Claims, 8 Drawing Sheets

MOLDING APPARATUS

CROSS-REFERENCE TO RELATED APPLICATIONS

This application is related to commonly-assigned copending application Ser. No. 12/261,292, entitled "MOLDING APPARATUS", and Ser. No. 12/261,295, entitled "MOLDING APPARATUS". Disclosures of the above-identified application are incorporated herein by reference.

BACKGROUND

1. Technical Field

The present invention relates to a molding apparatus.

2. Description of Related Art

Molding apparatuses are widely used for manufacturing optical articles, such as light guide plates, lenses, and so on. For lenses, concentricity of the two opposing surfaces is an important factor in molding precision.

Figure 8:
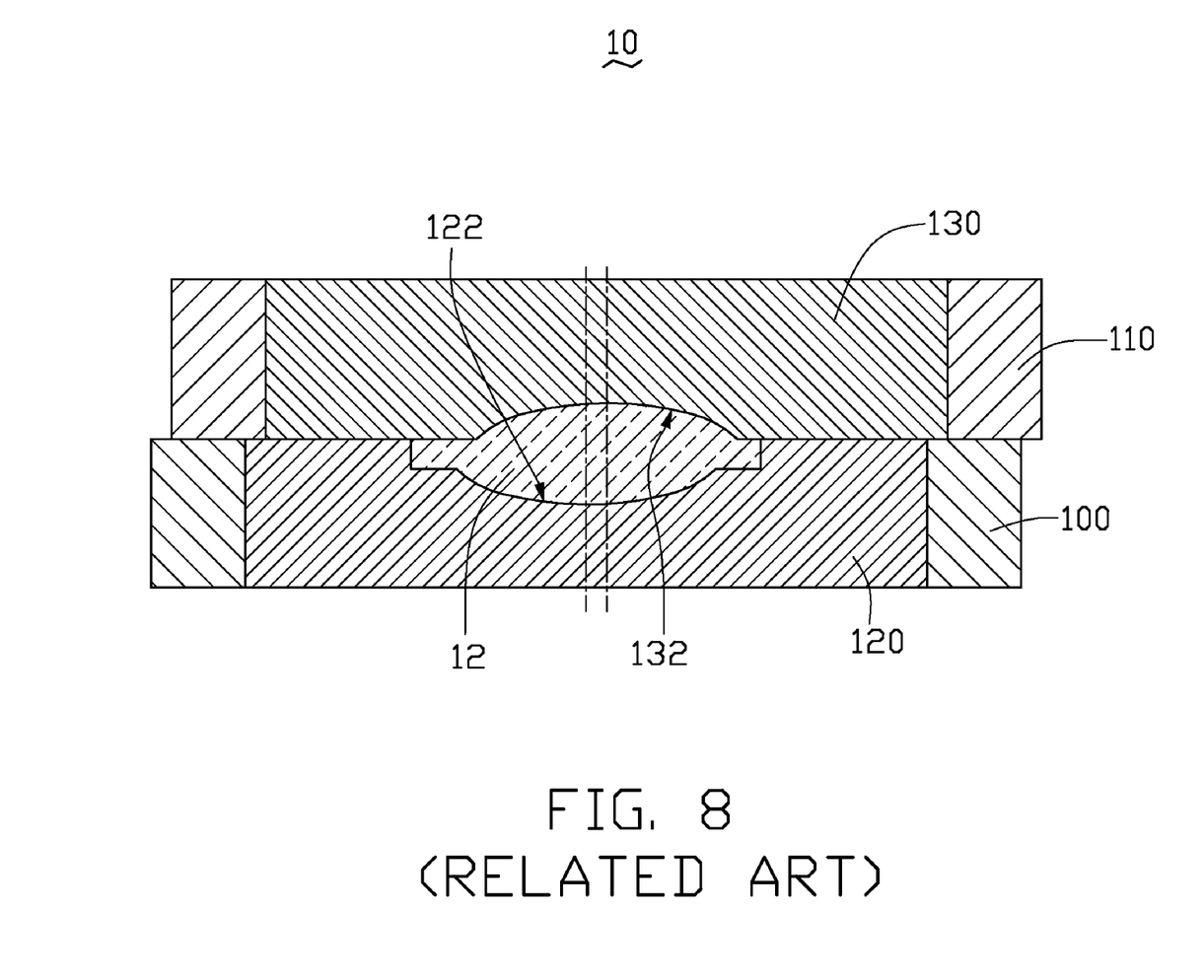
FIG. 8 is a cross-sectional view of a conventional molding apparatus.

Referring to FIG. 8, a typical molding apparatus 10 for molding an optical lens 12 includes a first mold part 100 and a second mold part 110 facing the first mold part 100. A first mold core 120 and a second mold core 130 are mounted in the first mold part 100 and the second mold part 110, respectively. The first mold core 120 has a first curved molding surface 122, and the second mold core 130 has a second curved molding surface 132 facing the first curved molding surface 122. The first molding surface 122 is aligned with the second molding surface 132 and a molding chamber is defined therebetween.

As shown in FIG. 8, when assembling the first and the second mold parts 100 and 110 together, a loss of concentricity may occur between the first and the second molding surfaces 122 and 132. This leads to difficulty in assembly and disassembly of the first and the second mold parts 100 and 110, and abrasion of the mold cores 120 and 130 may occur after repeated use. In addition, disassembly and modification of the whole molding apparatus may be needed, reducing efficiency and increasing cost.

Therefore, a molding apparatus is desired to overcome the above-described deficiencies.

SUMMARY

A molding apparatus includes a first mold half, a first mold core received in the first mold half, a second mold half opposite to the first mold half, a second mold core and a plurality of spacers. The first mold core has a first molding surface. The second mold core includes a sleeve and a core insert. The sleeve is received in the second mold core. The sleeve includes a receiving hole defined therein, and a plurality of parallel grooves defined in an inner surface in the receiving hole. The grooves are angularly equidistantly spaced from each other. The core insert is received in the receiving hole of the sleeve. The core insert has a second molding surface facing the first molding surface. The first molding surface and the second molding surface are configured for cooperatively defining a molding cavity therebetween. The plurality of spacers is configured for being selectively disposed in the corresponding grooves. Each of the spacers is configured for being sandwiched between the sleeve and the core insert. The plurality of spacers is configured for aligning the second molding surface with the first molding surface.

Advantages and novel features will become more apparent from the following detailed description of the present molding apparatus, when taken in conjunction with the accompanying drawings.

BRIEF DESCRIPTION OF THE DRAWINGS

Many aspects of the present molding apparatus can be better understood with reference to the following drawings. The components in the drawings are not necessarily drawn to scale, the emphasis instead being placed upon clearly illustrating the principles of the present molding apparatus. Moreover, in the drawings, like reference numerals designate corresponding parts throughout the several views.

DETAILED DESCRIPTION OF THE EMBODIMENT

Reference will now be made to the drawings to describe embodiments of the present molding apparatus.

Figure 1:
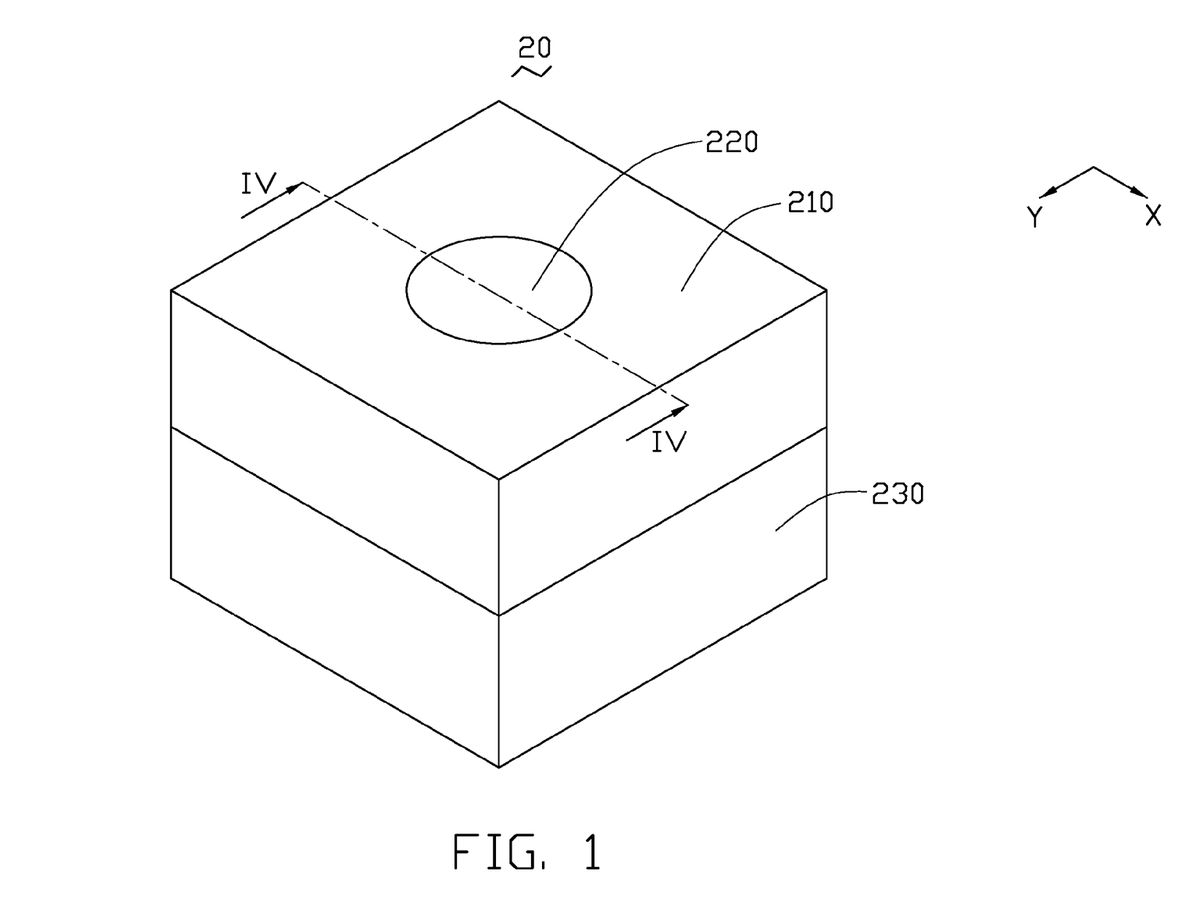
FIG. 1 is an assembled isometric view of an embodiment of a molding apparatus including a sleeve for receiving an core insert.
Figure 2:
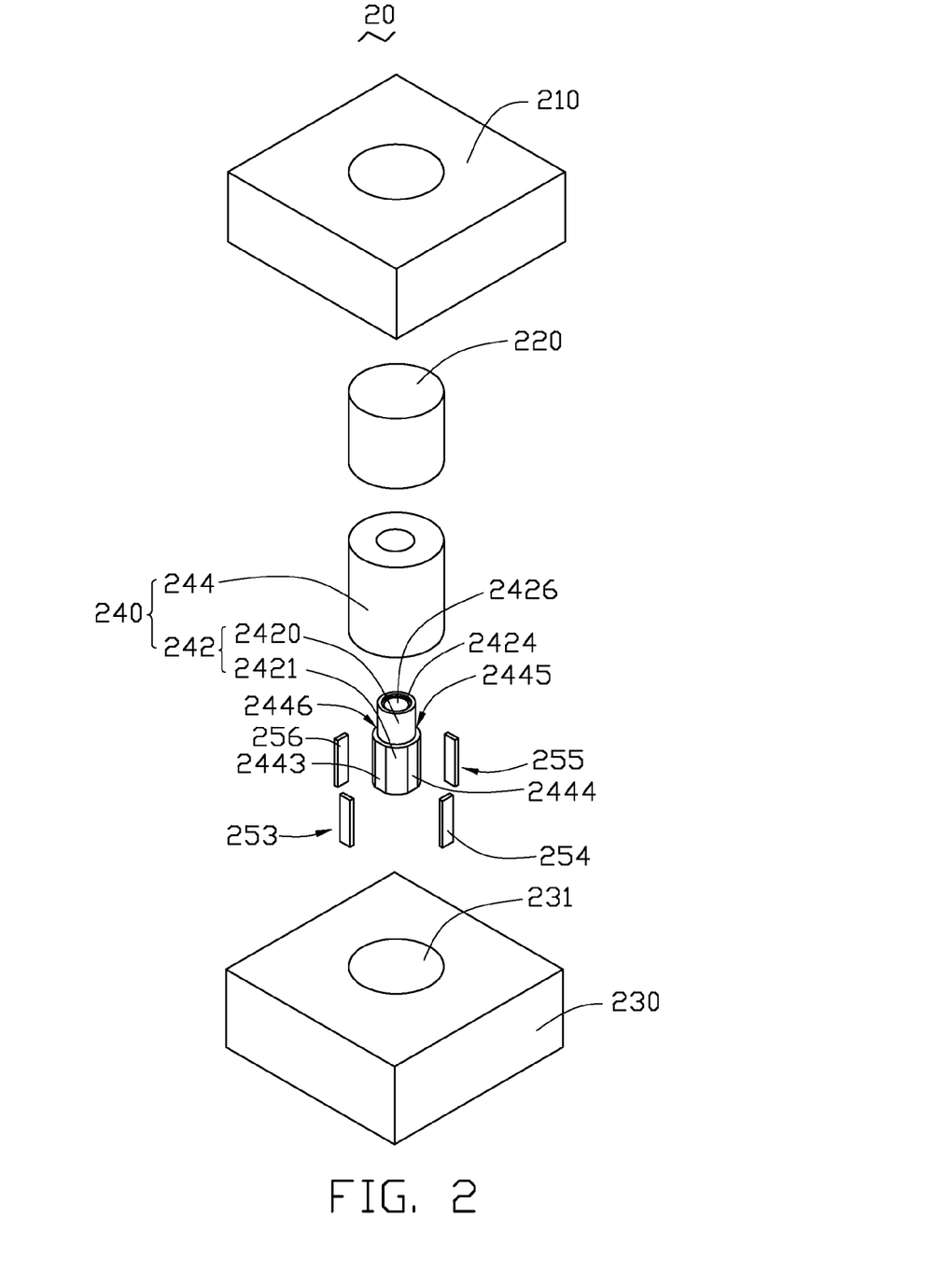
FIG. 2 is an exploded isometric view of the molding apparatus shown in FIG. 1.

Referring to FIGS. 1 and 2, a molding apparatus 20 of a first embodiment includes a first mold half 210, a first mold core 220 installed in the first mold half 210, a second mold half 230, and a second mold core 240 installed in the second mold half 230.

The first mold core 220 is installed in the first mold half 210. The first mold core 220 has a first curved molding surface 222 with a principal axis O (see FIG. 6).

A receiving cavity 231 is defined in the second mold half 230 and extends through the second mold half 230. The second mold core 240 is received in the receiving cavity 231. The second mold core 240 includes a core insert 242 and a sleeve 244 for receiving the core insert 242. The sleeve 244 is matingly received in the receiving cavity 231 and the core insert 242 is received in the sleeve 244.

The core insert 242 includes a first cylindrical portion 2420 and a second cylindrical portion 2421 coaxial with the first cylindrical portion 2420. The second cylindrical portion 2421 has a diameter greater than that of the first cylindrical portion 2420, and an annular step is formed between the first and the second cylindrical portions 2420 and 2421. The second cylindrical portion 2421 has a length less than that of the first cylindrical portion 2420. Four flat side surfaces 2443, 2444, 2445 and 2446 are formed along the direction of extension of the second cylindrical portion 2421. The four flat side surfaces 2443, 2444, 2445 and 2446 are angularly equidistantly spaced from each other. Thus, the flat side surface 2443 is positioned opposite to and parallel with the flat side surface 2445, and the flat side surface 2444 is positioned opposite to and parallel with the flat side surface 2446. The first cylindrical portion 2420 has an end face 2424. A second curved molding surface 2426 with a principal axis O' is defined in the end face 2424 (see FIG. 6).

Figure 3:
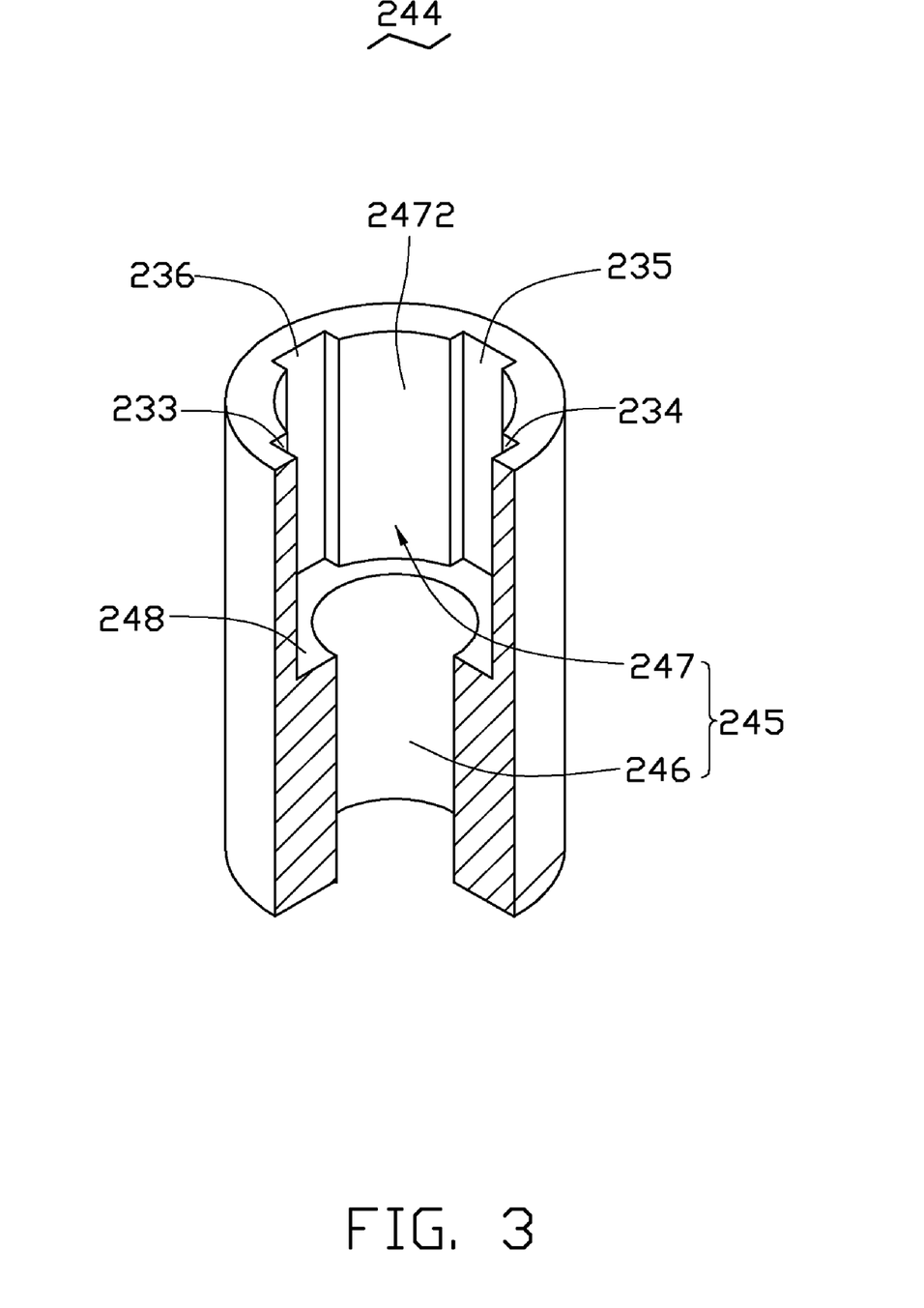
FIG. 3 is an enlarged sectional view of the sleeve shown in FIG. 1.

Referring to FIG. 3, the sleeve 244 has a cylindrical shape. A receiving hole 245 with a stepped structure is defined in the sleeve 244 and penetrates through the sleeve 244 along a direction parallel with a principal axis of the sleeve 244. The receiving hole 245 includes a first cylindrical hole portion 246 and a second cylindrical hole portion 247 in communication with each other. Both of the first and second cylindrical hole portions 246 and 247 are coaxial with the sleeve 244. A radius of the first cylindrical hole portion 246 is less than that of the second cylindrical hole portion 247 so that an annular step 248 is formed between the first and second cylindrical hole portions 246 and 247.

The first cylindrical hole portion 246 is configured for receiving the first cylindrical portion 2420. A radius of the first cylindrical hole portion 246 is greater than that of the first cylindrical portion 2420, and the radius of the first cylindrical hole portion 246 may be about 0.005 millimeter greater than the radius of the first cylindrical portion 2420. A radius of the second cylindrical portion 2421 is greater than that of the first cylindrical hole portion 246 so that the second cylindrical portion 2421 can contact the annular step 248 formed between the first and second cylindrical hole portions 246 and 247.

The second cylindrical hole portion 247 of the sleeve 244 is configured for receiving the second cylindrical portion 2421. The second cylindrical hole portion 247 is defined by a cylindrical surface 2472 in the sleeve 244. A radius of the cylindrical surface 2472 is greater than that of the radius of the second cylindrical portion 2421, and the radius of the first cylindrical surface 2472 may be about 0.01 millimeters greater than the radius of the second cylindrical portion 2421. Four grooves 233, 234, 235 and 236 are defined in the cylindrical surface 2472 and extend along a direction parallel with the principal axis of the second cylindrical hole portion 247. The four grooves 233, 234, 235 and 236 are angularly equidistantly spaced from each other to correspond to the four flat side surfaces 2443, 2444, 2445 and 2446.

Figure 4:
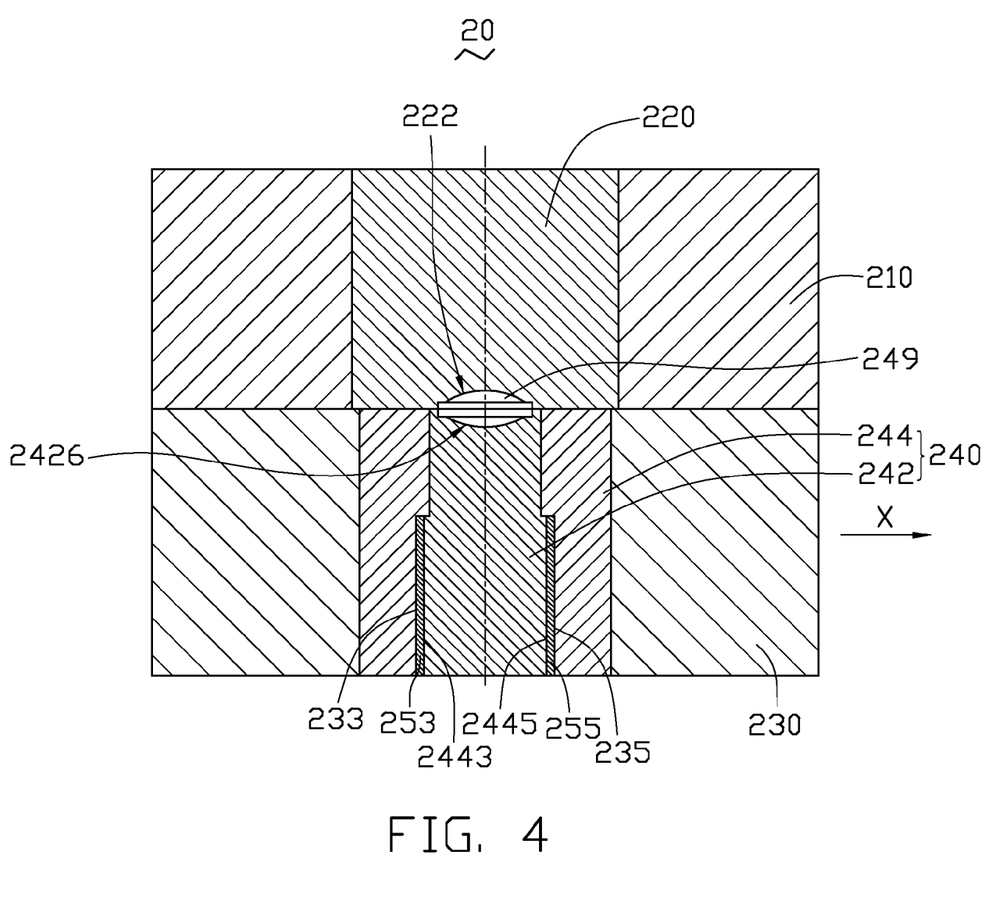
FIG. 4 is a cross-sectional view taken along line IV-IV of FIG. 1.

Referring to FIGS. 2 and 4, in assembly, the first mold core 220 is installed in the first mold half 210. The sleeve 244 is installed in the second mold half 230. The core insert 242 is installed in the receiving hole 245 of the sleeve 244 in a manner that the four flat side surfaces 2443, 2444, 2445 and 2446 faces towards the four corresponding grooves 233, 234, 235 and 236. Four spacers 253, 254, 255 and 256 are positioned between the flat side surface 2443 and a bottom surface of the groove 233, flat side surface 2444 and a bottom surface of the groove 234, flat side surface 2445 and a bottom surface of the groove 235, and flat side surface 2446 and a bottom surface of the groove 236, respectively. Each of the fours spacers contacts the corresponding plane of the second cylindrical portion 2421 and the bottom surface of the corresponding groove 233. The four spacers can be replaced by other spacers with different thicknesses to adjust the position of the core insert 242 in the sleeve 244. The first mold half 210 is positioned opposite the second mold half 230 in a manner that the first molding surface 222 of the first mold core 220 faces the second molding surface 2426 of the core insert 242. By choosing spacers with proper thicknesses, the first molding surface 222 will be coaxial with the second molding surface 2426. The first molding surface 222 and the second molding surface 2426 are configured for cooperatively defining a molding cavity 249 therebetween.

Figure 5:
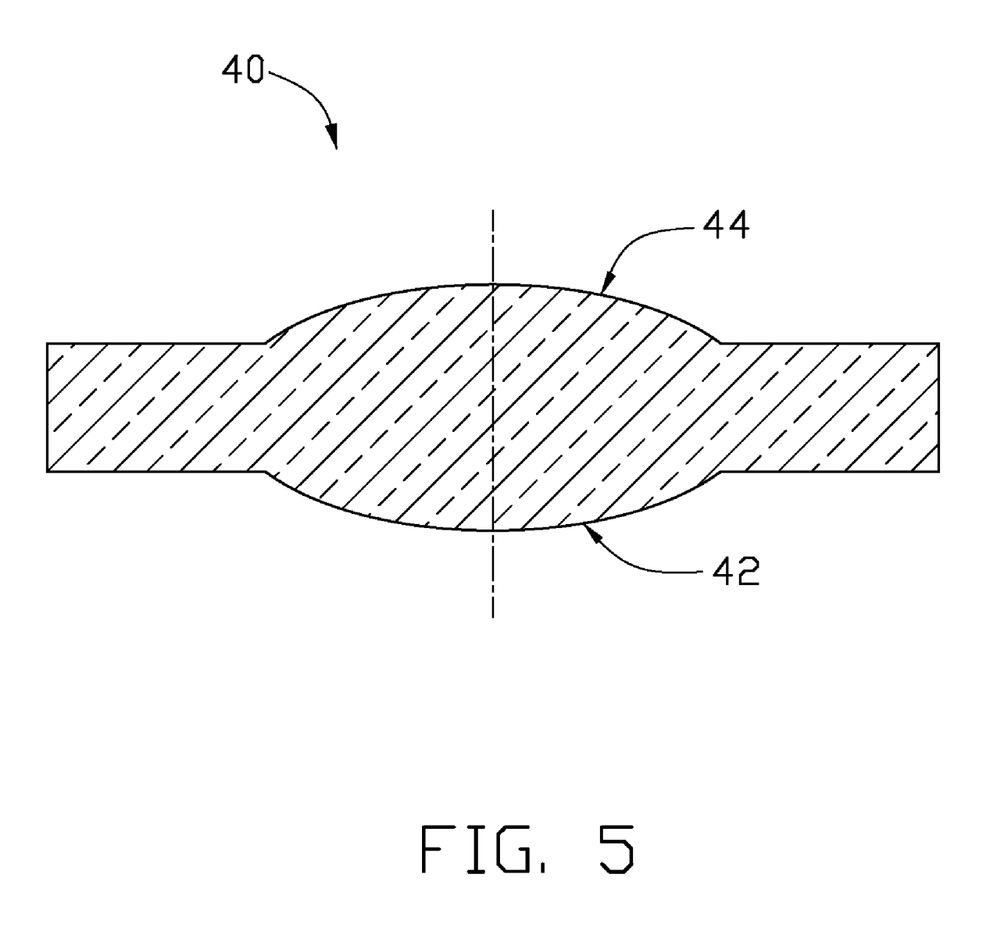
FIG. 5 is cross-sectional view of a lens formed by the molding apparatus shown in FIG. 1.

Referring to FIG. 5, a lens 40 molded by the molding apparatus 20 is shown. The lens 40 has two curved surfaces 42 and 44 opposite to each other, wherein the surface 42 is formed corresponding to the second molding surface 2426 and the surface 44 is formed corresponding to the first molding surface 222. The curved surface 42 is coaxial with the curved surface 44 because the first molding surface 222 is aligned coaxially with the second molding surface 2426.

It is understood that the flat side surfaces 2443, 2444, 2445 and 2446 may be omitted. In such case, each of the spacers can have a concave surface to mate with the outer surface of the second cylindrical portion 2421. In addition, the second cylindrical portion 2421 can also have a length equal to the first cylindrical portion 2420 so that the entire outer surface of the first cylindrical portion 2420 is covered by the second cylindrical portion 2421.

Figure 6:
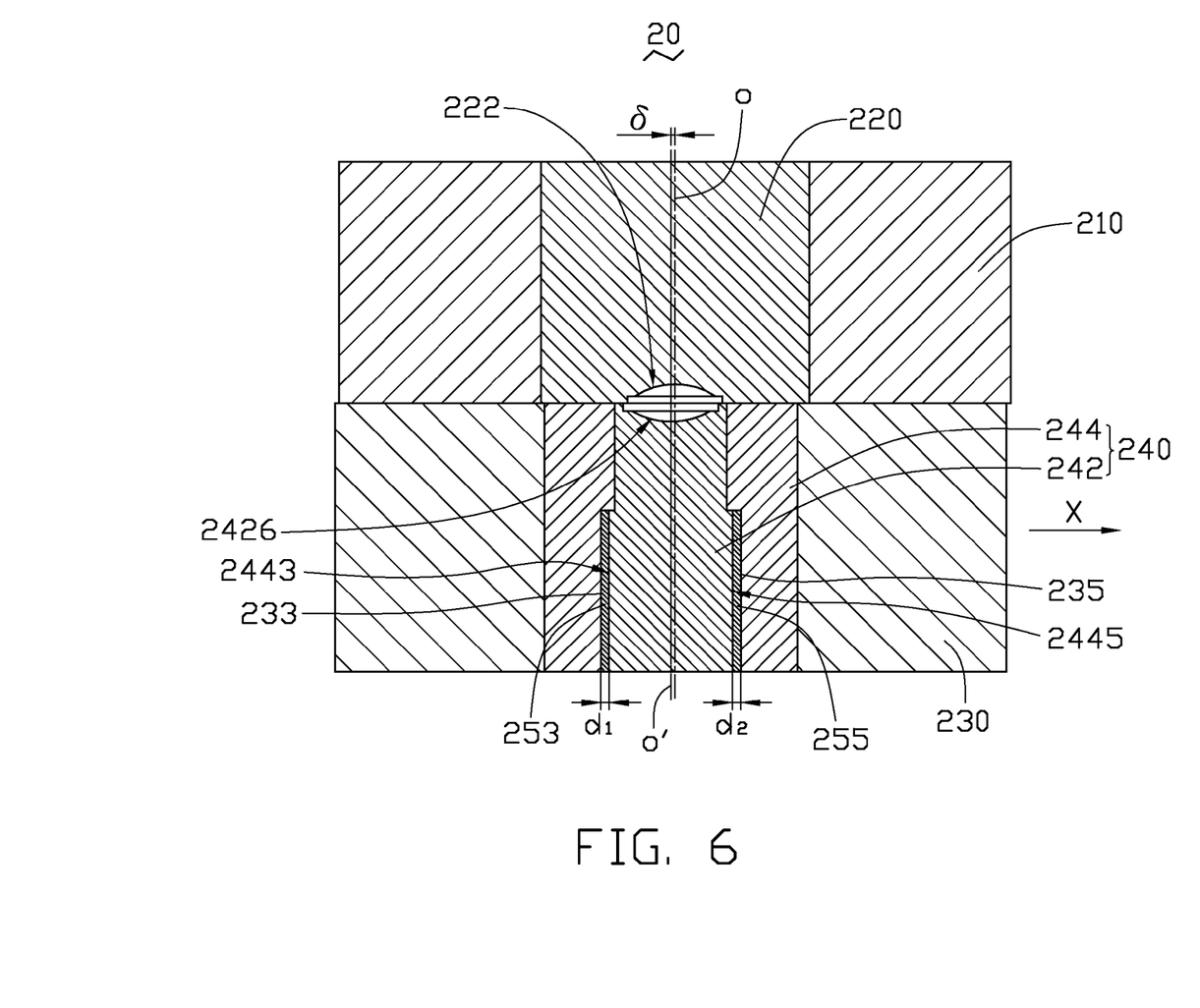
FIG. 6 is a cross-sectional view of early stages of a process of a concentricity adjusting method using the molding apparatus of FIG. 1.
Figure 7:
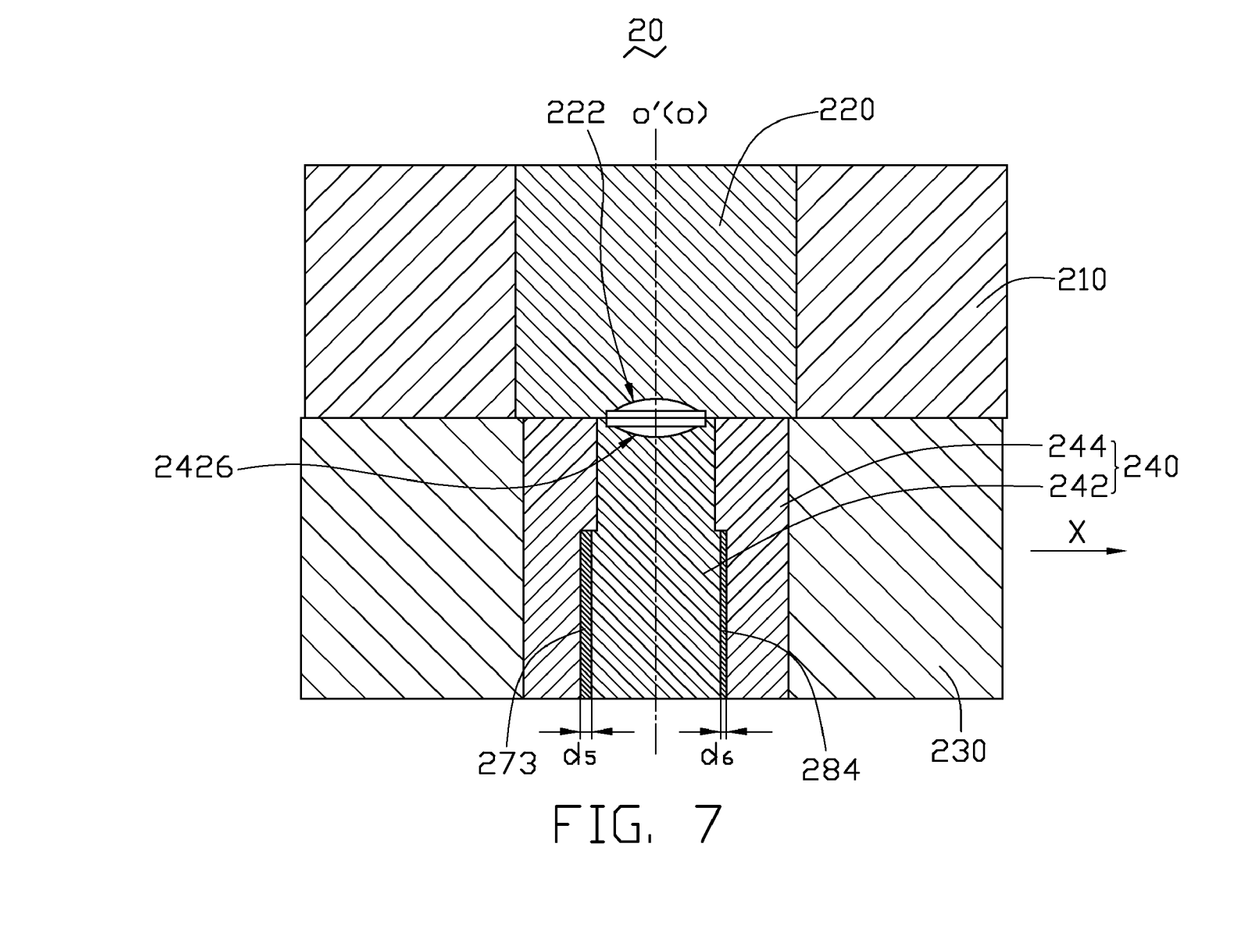
FIG. 7 is a cross-sectional view of latter stages of the process of the concentricity adjusting method using the molding apparatus of FIG. 1.

Referring to FIGS. 6 and 7, a concentricity adjusting method using the molding apparatus 20, when an eccentricity between the first molding surface 222 and the second molding surface 2426 occurs, is described in detail as follows.

Referring to FIG. 6, the first mold half 210 and the second mold 230 are assembled together in a manner that the first molding surface 222 faces the second molding surface 2426. In this step, there is a lateral alignment tolerance $\delta$ along a direction X in FIG. 6 between the principal axis O of the first molding surface 222 and the principal axis O' of the second molding surface 2426. The direction X is perpendicular with the flat side surfaces 2443 and 2445. The spacer 253 has a thickness d1 and the spacer 255 has a thickness d2. The spacer 253 contacts the flat side surface 2443 and the bottom surface of the groove 233, and the spacer 255 contacts the flat side surface 2445 and the bottom surface of the groove 235.

The lateral alignment tolerance $\delta$ can be measured by a three-coordinate measuring machine. One method of measuring the lateral alignment tolerance $\delta$ is to measure coordinate values of the centers of the first and second molding surface 222 and 2426 and calculate a distance between the centers of the first and second molding surface 222 and 2426 at the direction X, to obtain the lateral alignment tolerance $\delta$. Another method is to measure a lateral alignment tolerance $\delta'$ between two opposite curved surfaces of a lens molded by the molding apparatus 20 and infer the lateral alignment tolerance $\delta$ based on the lateral alignment tolerance $\delta'$.

Referring to FIG. 7, the spacer 253 and 255 are replaced by a spacer 273 having a thickness d5 and a spacer 284 having a thickness d6, respectively. The thickness d5 equals the thickness d1 plus the lateral alignment tolerance $\delta$, i.e. d5=d1+$\delta$. The thickness D6 equals the thickness d2 minus the lateral alignment tolerance $\delta$, i.e. d6=d1−$\delta$. In such case, the lateral alignment tolerance $\delta$ between the first molding surface 222 and the second molding surface 2426 are corrected. Thus, the first molding surface 222 becomes coaxial with the second molding surface 2426.

When the lateral alignment tolerance between the first and second molding surface 222 and 2426 is along a direction Y perpendicular with the flat side surfaces 2444 and 2446, replacing the spacers 254 and 256 can resolve the problem. Additionally, when the lateral alignment tolerance between the first and second molding surface 222 and 2426 is inclined to the directions X and Y, replacing all the four spacers 253, 254, 255 and 256 can resolve the problem.

It is to be understood that the number of the spacer and the corresponding groove defined in the inner surface 2472 of the sleeve 244 can be two, three or more than four, as long as the spacers are angularly equidistantly spaced from each other.

In this embodiment, the lateral alignment tolerance between the first molding surface 222 and the second molding surface 2426 is correctable by replacing the spacers 253, 254, 255 and 256 with spacers of different thicknesses. This can avoid modification of the whole molding apparatus 20, thus increasing efficiency and reducing cost of manufacture.

It is to be understood that the above-described embodiment is intended to illustrate rather than limit the invention. Variations may be made to the embodiment without departing from the spirit of the invention as claimed. The above-described embodiments are intended to illustrate the scope of the invention and not restrict the scope of the invention.

What is claimed is:

1. A molding apparatus comprising:
   a first mold half;
   a first mold core received in the first mold half, the first mold core having a first molding surface;
   a second mold half positioned opposite to the first mold half;
   a second mold core comprising:
      a sleeve received in the second mold core, the sleeve including a receiving hole defined therein, wherein the receiving hole including a first cylindrical hole portion and a second cylindrical hole portion in communication with the first cylindrical hole portion, a radius of the second cylindrical hole portion being greater than that of the first cylindrical hole portion, the sleeve including an annular step formed between the first cylindrical hole portion and the second cylindrical hole portion; and a plurality of parallel grooves defined in the second cylindrical hole portion of the receiving hole, wherein the grooves being angularly equidistantly spaced from each other
      a core insert received in the receiving hole of the sleeve, the core insert having a second molding surface facing the first molding surface, the first molding surface and the second molding surface configured for cooperatively defining a molding cavity therebetween, the core insert including a first cylindrical portion and a second cylindrical portion coaxial with the first cylindrical portion, the second cylindrical portion having a diameter greater than that of the first cylindrical portion, and an annular step being formed between the first cylindrical portion and the cylindrical portion, a radius of the second cylindrical portion being less than that of the second cylindrical hole portion, and the second cylindrical portion of the core insert being configured for being received in the second cylindrical hole portion; and
   a plurality of spacers configured for being selectively disposed in the corresponding grooves, each of the spacers configured for being sandwiched between the sleeve and the core insert, the plurality of spacers being configured for aligning the second molding surface with the first molding surface.

2. The molding apparatus of claim 1, wherein the second cylindrical portion includes a plurality of flat side surfaces, the plurality of flat side surfaces being configured for coming into contact with the corresponding spacers.

3. The molding apparatus of claim 1, wherein the annular step of the core insert contacts the annular step of the sleeve.

4. The molding apparatus of claim 1, wherein the radius of the first cylindrical hole portion is about 0.005 millimeter greater than the radius of the first cylindrical portion.

5. The molding apparatus of claim 4, wherein the radius of second cylindrical hole portion is about 0.01 millimeter greater than the radius of the second cylindrical portion.

6. The molding apparatus of claim 1, wherein the first molding surface is a curved surface with a first principal axis, the second molding surface is a curved surface with a second principal axis, the first axis being coaxial with the second principal axis.

* * * * *